United States Patent
Hayashi et al.

(10) Patent No.: US 8,652,381 B2
(45) Date of Patent: *Feb. 18, 2014

(54) RESIN TRANSFER MOLDING DEVICE AND RESIN TRANSFER MOLDING METHOD

(71) Applicant: Mitsubishi Heavy Industries, Ltd., Tokyo (JP)

(72) Inventors: Noriya Hayashi, Aichi (JP); Hiroshi Mizuno, Aichi (JP); Koichi Hasegawa, Aichi (JP); Kazuo Ota, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,662

(22) Filed: Jun. 26, 2013

(65) Prior Publication Data

US 2013/0285293 A1 Oct. 31, 2013

Related U.S. Application Data

(60) Continuation of application No. 13/177,838, filed on Jul. 7, 2011, now Pat. No. 8,501,070, which is a division of application No. 12/308,949, filed as application No. PCT/JP2007/065505 on Aug. 8, 2007, now Pat. No. 8,506,278.

(30) Foreign Application Priority Data

Aug. 8, 2006 (JP) ................... 2006-215580

(51) Int. Cl.
B29C 45/14 (2006.01)
B29C 35/08 (2006.01)
A23G 1/22 (2006.01)

(52) U.S. Cl.
USPC ........... 264/259; 264/102; 264/257; 264/319; 264/328.1; 264/328.12; 264/459; 264/494

(58) Field of Classification Search
USPC ......... 264/102, 257, 259, 319, 327.1, 328.12, 264/459, 494; 425/110, 542, 546, 557, 562
See application file for complete search history.

(56) References Cited

U.S. PATENT DOCUMENTS 4,902,215 A 2/1990 Seemann, III
4,942,013 A 7/1990 Palmer et al.
(Continued)

FOREIGN PATENT DOCUMENTS

JP 57-208210 12/1982
JP 7-300504 11/1995
(Continued)

OTHER PUBLICATIONS

International Search Report mailed Nov. 13, 2007 in International Application No. PCT/JP2007/065505.
(Continued)

Primary Examiner — Atul P. Khare
(74) Attorney, Agent, or Firm — Wenderoth, Lind & Ponack, L.L.P.

(57) ABSTRACT

A resin transfer molding (RTM) molding device is designed to mold a fiber-reinforced plastic (FRP) molded body by injecting a resin composition into a mold and by impregnating the molded body therewith. The resin composition is a chain curing polymer (CCP). A CCP accommodating layer is disposed adjacent to an outer side of the molded body. The layer contains the CCP. The layer is provided with a Vf limit value, the value defined by the curing characteristics of the CCP and the characteristics of dissipation of heat from the CCP to the exterior. An element for separating the molded body is disposed between the body and the layer.

18 Claims, 3 Drawing Sheets

(56) References Cited

U.S. PATENT DOCUMENTS

| | | |
|---|---|---|
| 5,052,906 A | 10/1991 | Seemann |
| 5,114,633 A | 5/1992 | Stewart |
| 5,489,410 A | 2/1996 | Baumgartner et al. |
| 5,576,030 A | 11/1996 | Hooper |
| 5,653,907 A | 8/1997 | Kendall et al. |
| 5,914,385 A | 6/1999 | Hayashi et al. |
| 6,148,899 A | 11/2000 | Cornie et al. |
| 6,245,827 B1 | 6/2001 | Gregory |
| 6,537,483 B1 | 3/2003 | Cartwright et al. |
| 6,599,954 B1 | 7/2003 | Hayashi et al. |
| 6,627,142 B2 | 9/2003 | Slaughter et al. |
| 6,630,095 B2 | 10/2003 | Slaughter et al. |
| 7,148,294 B2 | 12/2006 | Kamae et al. |
| 7,300,894 B2 | 11/2007 | Goodell et al. |
| 7,501,087 B2 | 3/2009 | Kamae et al. |
| 7,785,525 B2 | 8/2010 | Hayashi et al. |
| 2002/0022422 A1 | 2/2002 | Waldrop et al. |
| 2004/0032062 A1 | 2/2004 | Slaughter et al. |
| 2005/0040553 A1 | 2/2005 | Slaughter et al. |
| 2005/0086916 A1 | 4/2005 | Caron |
| 2006/0125155 A1 | 6/2006 | Sekido et al. |

FOREIGN PATENT DOCUMENTS

| | | |
|---|---|---|
| JP | 08-283388 | 10/1996 |
| JP | 11-193322 | 7/1999 |
| JP | 2001-002760 | 1/2001 |
| JP | 2001-089639 | 4/2001 |
| JP | 2003-136548 | 5/2003 |
| JP | 2004-090349 | 3/2004 |
| JP | 2005-216690 | 8/2005 |
| JP | 2006-192628 | 7/2006 |
| WO | 94/21455 | 9/1994 |
| WO | 2007/013544 | 2/2007 |

OTHER PUBLICATIONS

UniFrax Product Information Sheet for FiberFrax and DuraBoard (No date).

U.S. Patent Office Action issued Apr. 23, 2012 in corresponding U.S. Appl. No. 12/308,949.

U.S. Patent Office Action issued Oct. 3, 2012 in U.S. Appl. No. 12/308,949.

U.S. Patent Office Notice of Allowance issued Apr. 17, 2013 in U.S. Appl. No. 12/308,949.

U.S. Notice of Allowance issued Oct. 4, 2013 in U.S. Appl. No. 13/927,679.

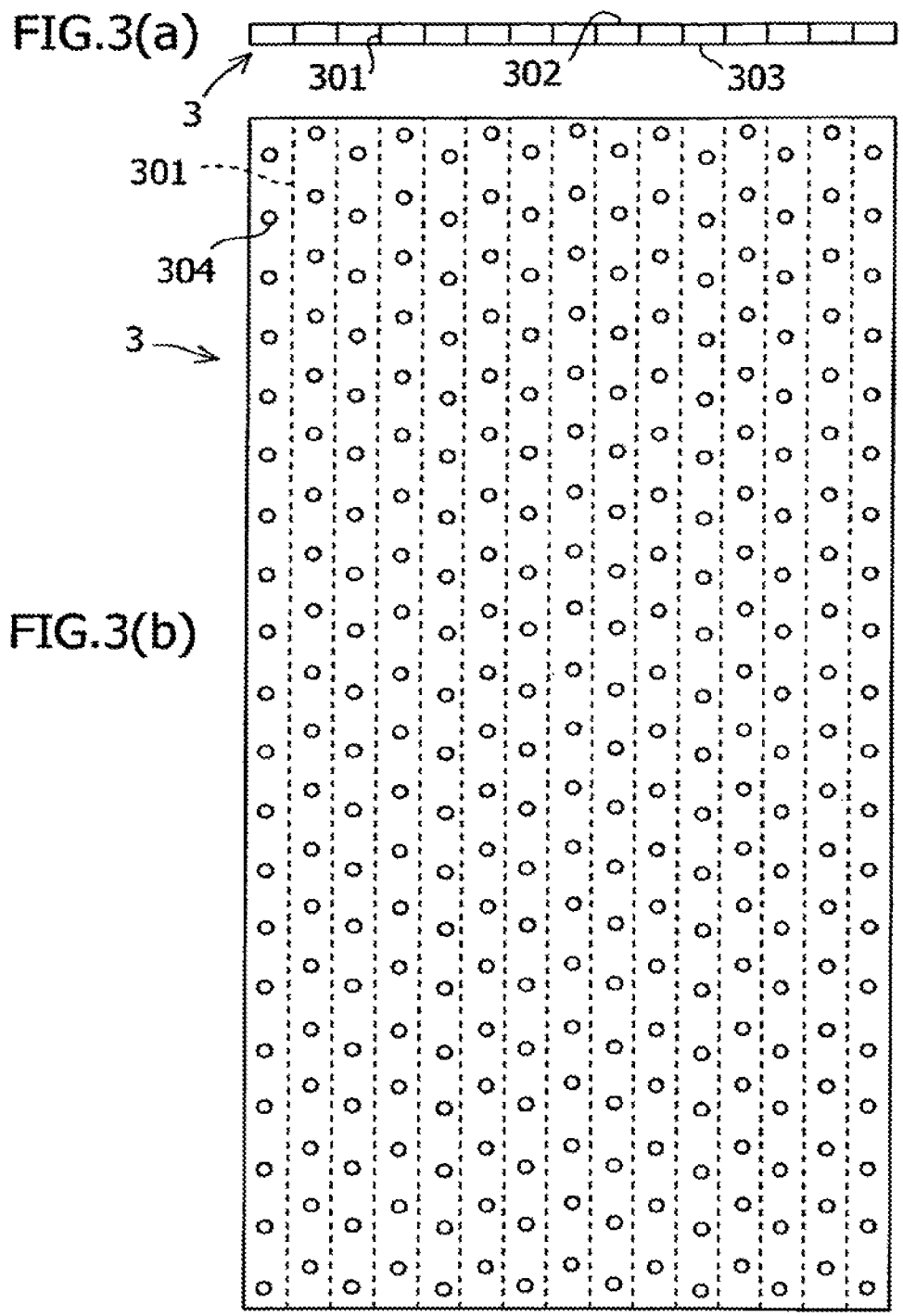

RESIN TRANSFER MOLDING DEVICE AND RESIN TRANSFER MOLDING METHOD

TECHNICAL FIELD

The present invention relates to a resin transfer molding (also referred to as "RTM" hereinafter) device and to an RTM molding method for use in molding of a structure made of fiber-reinforced plastics (also referred to as "FRP" hereinafter). In particular, in the present invention, use of a CCP (resin composition of chain curing type) contributes to an increase in the fiber volume content (also referred to as "Vf" hereinafter) of a FRP body to be molded. This results in the FRP body having superior strength and superior lightweight properties.

BACKGROUND ART

In recent years, a radiation-curable resin, for example, a UV-curable resin, has been used in various fields and for various applications. Such types of resins are only cured at a location therein, which location is irradiated by at least a certain amount of radiation. On the other hand, radiation, for example, UV light, attenuates in the process of traveling into a resin. Therefore, it is difficult for radiation to reach deeper levels. In addition, radiation would be absorbed by a substance absorbent at the same wavelength as that of the radiation. Thus, radiation is greatly subject to attenuation and absorption.

Therefore, a photocurable resin is cured only to a depth of several micrometers to several millimeters. That is, the resin is not cured at deeper levels. Therefore, it is difficult or impossible to apply such resin as a thick material. In addition, if such resin contains a filler, etc., having a characteristic of hindering the transmission of radiation, the curing process would be easily disrupted or even blocked. Therefore, the range of applications has been centered on the fields of photoresists, coatings, paints, adhesives, varnishes, etc. These are the problems of such resins.

In order to solve the above problems, a range of products, represented by the following, has been provided:

An easily curable UV-curable resin (that is, an "active radiation curable composition" from Mitsubishi Rayon Co. Ltd. (see Patent Document 1 (JP 8-283388A))); and A UV-ray-heat curable resin (that is, "Optomer KS series" from Asahi Denka Co. Ltd.; "Radecure" from Hitachi Kasei Kogyo Co. Ltd.; and "UE resin" from Toyo Boseki Co. Ltd. (see Patent Document 2 (JP 61-38023A), etc.)).

However, an easily curable UV-curable resin is subject to interruption of the curing process when radiation is blocked by a filler, etc. This is a problem that is yet to be solved. A UV-ray-heat curable resin is first irradiated by UV rays and is then heated. The curability by radiation of such a resin is merely as high as that of photocurable resin. That is, the problems with curing of a thick material or with curing of a resin containing a filler are not at all solved. These problems are merely addressed by the thermal curing process to be carried out after the photocuring process (this process is able to cure only a surface layer). That is, these problems have hitherto not been substantially solved.

If a technique is established to quickly cure a thick resin material that contains a radiation blocking substance and has a characteristic of attenuating and absorbing radiation to a large degree, this enables such resin material to be applied not only to the conventional fields of applications but also to various other fields to which such resin material has hitherto been not applicable due to the above problems with photocurable resin. In particular, one such field is that of FRP resins, in particular, CFRP resins.

Conventionally, an FRP lends itself to various processing methods or various manufacturing methods. However, a matrix resin is a thermal curable resin or a thermoplastic resin in most cases. Molding an FRP, in particular, a CFRP, has the following problems, among others. One is that temperature control is complicated and therefore prolongs curing time, resulting in high-cost processing. Another is that curing of a large FRP material requires a large heating furnace. Yet another is that a resin that is curable within a small amount of time at a normal temperature cannot be used for a large FRP material that requires prolonged molding time. Yet another is that change in resin viscosity due to change in temperature changes the stage of resin impregnation, which makes it difficult to carry out the molding process. Yet another is that the residual solvent causes generation of voids during the process of resin curing, resulting in deteriorated quality of the resultant molded product.

Recently, as a solution to the above problems, application of a photocurable resin to a matrix has attracted attention. Such a method of curing a matrix resin may be represented, in particular, by a filament winding method from Loctite Corp., the method using a UV curing process and a thermal curing process together ("fiber/resin compositions and a method of preparing same" from Loctite Corp. (see Patent Document 3 (JP 7-507836A)). However, an FRP molding method using such a composition is problematically executed as follows. First, an FRP is impregnated with resin but is not yet cured. Subsequently, the FRP is irradiated with UV radiation. This causes the surface thereof to be cured. This also causes the interior thereof to be gelled to a large degree. This makes it possible to maintain the shape thereof and the impregnation state thereof to a certain degree. Finally, the curing process is completed by heating.

In this method, very little change in resin viscosity is admittedly caused by change in temperature. In addition, the handling operation after the impregnation process is easy to perform. However, the thermal curing process is necessary for a complete curing. This increases the fuel and light expenses necessary for the thermal curing. This also requires prolonged working time. These, along with other factors, contribute to increases in costs of processing. In addition, completion of the curing process requires a prolonged time. In addition, a large FRP material requires a large heating furnace. These problems, among others, are yet to be solved.

In view of the disadvantages of the conventional radiation-curable resin and of an FRP, in particular, a CFRP, the present inventors have studied a technique to cure a thick resin material, containing an radiation blocking substance, by irradiating it, and a technique to radiation cure an FRP, in particular, a CFRP. As a result, the present inventors have developed a novel technique regarding a resin composition of the chain curing type. This technique involves a novel resin curing method able to also radiation-cure a substance having a characteristic of blocking radiation to a relatively large degree. Such a substance is, for example, a carbon, a carbon fiber (CF), a metal, a resin containing an inorganic filler, etc., (such as carbon fiber reinforced plastics (CFRP), a carbon/metal/inorganic substance containing resin, etc.). This technique also involves a composition used by the method, a molded article produced by the method, and a molding method based on the method. See Patent Document 4 (JP 11-193322A) and Patent Document 5 (JP 2001-89639A).

The following is the list of the patent documents:
Patent Document 1: JP 8-283388A
Patent Document 2: JP 61-38023A Patent Document 3: JP 7-507836A
Patent Document 4: JP 11-193322A
Patent Document 5: JP 2001-89639A

SUMMARY OF THE INVENTION

Problems to be Solved by the Present Invention

However, as it turned out, a case arose in which, even when such a resin composition was used, increase in the fiber volume content Vf of a FRP body to be molded suppressed the chain curing process. In view of this, in JP 2005-216690A, the present inventors provided the invention relating to the following RTM molding method. It is noted that this invention was not well known at the time of filing of the present Application and therefore does not constitute a prior technique with respect to the present invention.

The above-noted invention relates to the following method. A fiber reinforced material is disposed in a mold. In addition, a resin injection line and a suction line are provided. Both lines are designed to communicate with the interior of the mold. Then, the inner pressure of the mold is reduced via a suction operation. At the same time, a resin composition is injected into the mold. The fiber reinforced material is thereby impregnated with the resin composition. This method has the following features (1) to (3). (1) The above resin composition is a resin composition of the chain curing type. (2) After the onset of the curing reaction in the CCP, the maximum temperature at the front end portion of the chain-cured area within the CCP within 10 seconds from the onset is increased by 50 degrees Celsius or more from the temperature of the resin composition after the completion of the impregnation process and before the onset of the curing reaction. (3) The resin composition is chain-cured with a fiber volume content Vf of no less than 41%.

The above-noted invention relates also to the following method. A fiber reinforced material is disposed in a mold. In addition, a resin injection line and a suction line are provided. Both lines are designed to communicate with the interior of the mold. Then, the inner pressure of the mold is reduced via a suction operation. At the same time, a resin composition is injected into the mold. The fiber reinforced material is thereby impregnated with the resin composition. This method has the following features (1) to (3). (1) The above resin composition is a resin composition of the chain curing type. (2) After the onset of the curing reaction in the CCP, the maximum temperature at the front end portion of the chain-cured area within the CCP within 10 seconds from the onset is increased so as to reach a temperature no less than the temperature at the onset of the heat curing reaction in the resin composition. (3) The resin composition is chain-cured with a fiber volume content Vf of no less than 41%.

The RTM molding method according to the above-described invention has the following advantageous effects, among others.

(1) A resin reservoir is provided in a mold. The resin reservoir serves to retain the resin composition. Curing the resin composition in the reservoir enables the temperature of the resin composition immediately after the completion of the curing process of the resin composition to be increased.

(2) A radiation irradiation window is provided in the injection liner and/or the suction line. The resin composition is irradiated by radiation via the window. This initiates the chain curing reaction in the resin composition. In addition, the resin composition retained in the reservoir is chain-cured. This enables the temperature of the resin composition immediately after the completion of the curing process of the resin composition to be increased. Furthermore, as the above fiber reinforced material, a carbon fiber may be adopted. Then, electrically heating the carbon fiber enables the temperature of the resin composition immediately after the completion of the curing process of the resin composition to be increased.

However, the above-noted invention, although it has distinctly advantageous effects as noted above, has the following problems to be solved.

The above-described invention is designed to simply and directly apply the CCP (resin composition of chain curing type) to the RTM (resin transfer molding). Therefore, if a FRP body to be molded is large, and if the fiber volume content Vf of the FRP is large, a case may arise in which a carbon fiber must be electrically heated or in which it is difficult to maintain the resin in a well impregnated state. As such, it has been desired that a high fiber volume content Vf not constrain the chain curability. In addition, good resin impregnability has also been desired.

In view of the above, an object of the present invention is to provide a RTM molding device and a RTM molding method designed to make it possible to obtain a molded body having a superior strength and superior lightweight properties as well as a stable quality.

Means for Solving the Problem

According to the present invention, the above object is achieved by an RTM molding device comprising:
a mold having a molded body made of a reinforcement fiber material disposed therein;
a resin injection line communicating to the interior of the mold;
a suction line configured to decrease the inner pressure of the mold;
wherein a resin composition is injected into the mold to impregnate the body therewith so as to obtain a FRP molded body;
wherein the resin composition is a CCP;
a CCP accommodating layer containing the CCP and being disposed adjacent to the outer side of the body;
heat conduction suppressing means disposed between the layer and the mold and serving to suppress conduction of heat from one side having the layer located thereon to the other side having the mold located thereon;
means for separating the body disposed between the body and the layer;
wherein the layer and the suppressing means are combined so as to be provided with a Vf limit value defined by the curing characteristics of the CCP and the characteristics of dissipation of heat from the CCP into the exterior.

The RTM molding device according to the present invention is preferably provided with the following features recited in (1) to (5):

(1) The RTM molding device further comprises a mold layer body composed of means for separating the molded body, the CCP accommodating layer, and heat conduction suppressing means, these three elements layered one on another; and a resin reservoir provided in the mold configured to incorporate the mold layer body.

(2) The CCP accommodating layer comprises a CCP jacket to be filled with the CCP introduced from the resin injection line, the CCP jacket disposed on one side of the molded body or on each of both sides of the molded body.

(3) The heat conduction suppressing means comprises a heat insulating material having a heat conductivity of 0.3 W/m*K or less.
(4) A surface of the CCP jacket, the surface located toward the molded body, is porous.
(5) The CCP jacket and the molded body have a porous plate incorporating a wire mesh.

Another aspect of the present invention provides a RTM molding device comprising:

a mold having a molded body made of a reinforcement fiber material disposed therein;

a resin injection line communicating to the interior of the mold; a suction line configured to decrease the inner pressure of the mold;

wherein a resin composition is injected into the mold to impregnate the body therewith so as to obtain a FRP molded body;

wherein the resin composition is a CCP;

a CCP jacket configured to incorporate the molded body and designed to be filled with the CCP introduced from the resin injection line and disposed on one side of the molded body or on each of both sides of the molded body;

heat conduction suppressing means disposed between the layer and the mold and serving to suppress conduction of heat from one side having the layer located thereon to the other side having the mold located thereon;

means for separating the molded body disposed between the molded body and the layer;

wherein the means for separating the molded body, the CCP accommodating layer, and the heat conduction suppressing means are layered one on another to compose a mold layer body which is designed to extend in the longitudinal direction of the molded body;

wherein one side of the mold layer body, the side having a CCP inlet located thereon, is connected to the resin injection line;

wherein the other side of the mold layer body is connected to the suction line; and wherein the layer and the suppressing means are combined so as to be provided with a Vf limit value defined by the curing characteristics of the CCP and the characteristics of dissipation of heat from the CCP into the exterior.

Yet another aspect of the present invention provides an RTM molding method of molding a molded body by the use of the RTM molding device according to the present invention.

Yet another aspect of the present invention provides a molded body molded by the use of the RTM method according to the present invention.

Advantageous Effects of the Invention

The present invention provides a RTM molding device and a RTM molding method designed to make it possible to obtain a molded body having a superior strength and superior lightweight properties as well as a stable quality.

The present invention makes it possible to constantly maintain the fiber volume content Vf at a proper value while impregnating the molded body with the CCP and curing it. This advantageous effect is produced by the following configuration. A CCP accommodating layer is disposed. The layer contains the CCP. The layer is disposed adjacent to one side of the molded body or to each of both sides of the molded body. A heat conduction suppressing means is disposed. The means is disposed between the layer located on one side or each of both sides of the body and the mold. This allows the fiber volume content Vf to be maintained at a constant value or more. The layer and the suppressing means are combined so as to be provided with a Vf limit value. The value is defined by the curing characteristics of the CCP and the characteristics of dissipation of heat from the CCP into the exterior.

According to a preferable embodiment of the present invention, a CCP is injected in a desired supply pattern from the resin injection line 8 into the CCP accommodating layer, the layer containing the CCP, the layer disposed adjacent to one side of the molded body or to each of both sides of the molded body. In addition, at the termination portion (located away from the inlet) of the CCP accommodating layer, the suction line sucks the interior of the CCP accommodating layer (CCP jacket). This causes the CCP from within the CCP accommodating layer to be impregnated into the molded body via the resin jacket or the porous plate. On the other hand, the heat conduction suppressing means (a heat insulating material such as wood, etc.) disposed on each of both sides of the CCP accommodating layer (CCP jacket) suppresses conduction of heat from the CCP accommodating layer (CCP jacket) into the mold, thereby preventing the temperature of the molded body over the entire length thereof from decreasing. In addition, the injection amount of the CCP and the heat conduction capacity of the heat conduction suppressing means are adjusted in order to prevent the temperature of the molded body from excessively increasing. Under these conditions, the molded body containing the CCP form the CCP accommodating layer can be cured (chain-cured).

BRIEF DESCRIPTION OF THE DRAWINGS

FIGS. 3 (*a*) and (*b*) are a plan view and a cross sectional view, respectively, illustrating a CCP jacket.

Figure 1:
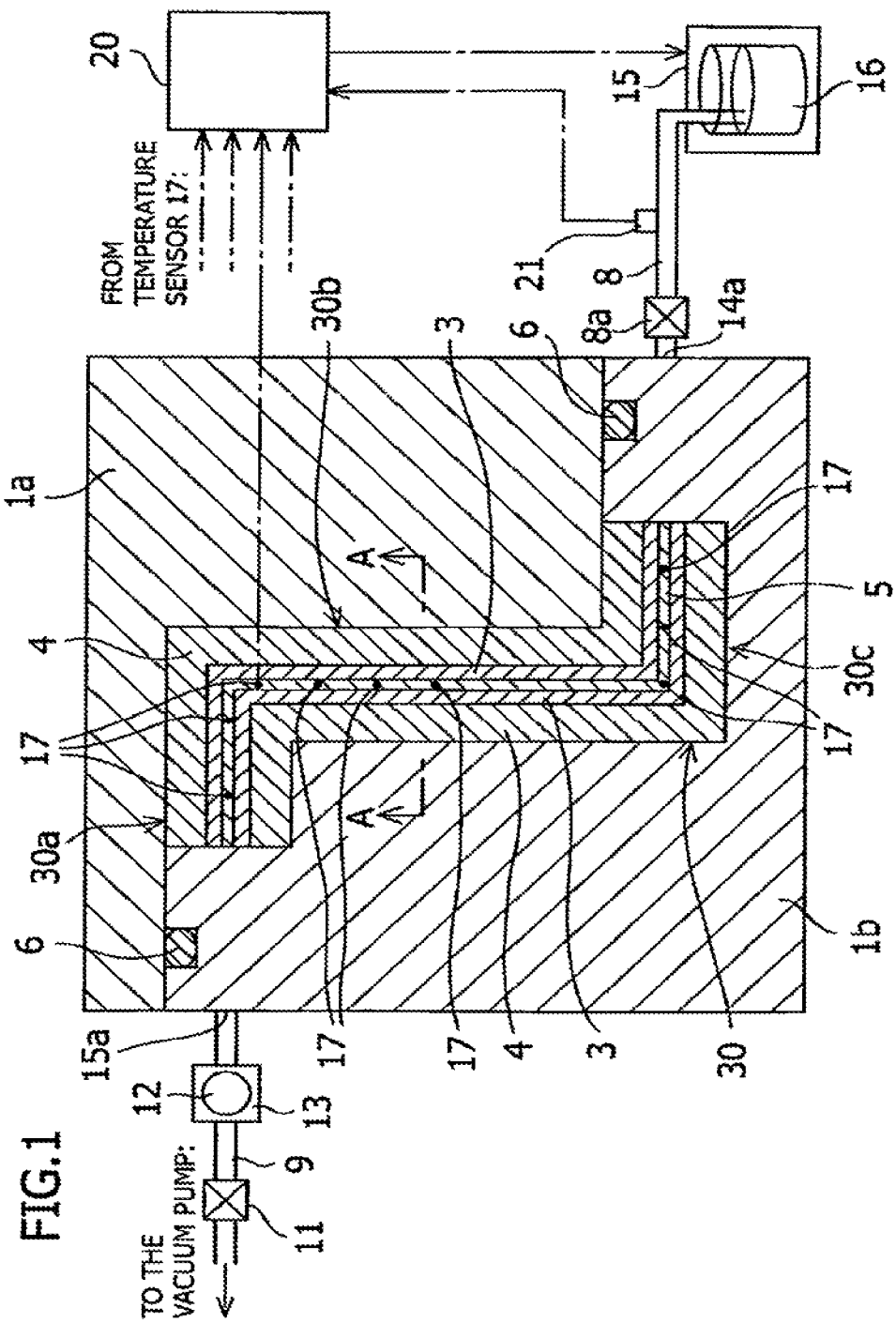
FIG. 1 is an overall schematic diagram of an RTM molding device according to one embodiment of the present invention. The diagram includes a longitudinal cross sectional view of a molded body.

1: mold
1*a*: upper mold half
1*b*: lower mold half
3: CCP (resin composition of chain curing type) jacket
4: heat insulating body (heat conduction suppressing means)
5: molded body (reinforcement fiber material)
7: mold releasing sheet
8: resin inlet line
8*a*, 11: on-off valve
9: suction line
12: radiation transmission window
13: aluminum block
14: resin reservoir
15: pressure container
15*a*: suction opening
16: resin tank
17: temperature sensor
20: controlling device
21: resin flow meter
28: perforated plate
30: mold layer body
30*a*: upper horizontal portion
30*b*: vertical portion
30*c*: lower horizontal portion

DETAILED DESCRIPTION OF THE INVENTION

The RTM molding device and the RTM molding method according to the present invention will be described below in detail based on embodiments thereof with reference to the accompanying drawings.

Figure 2:
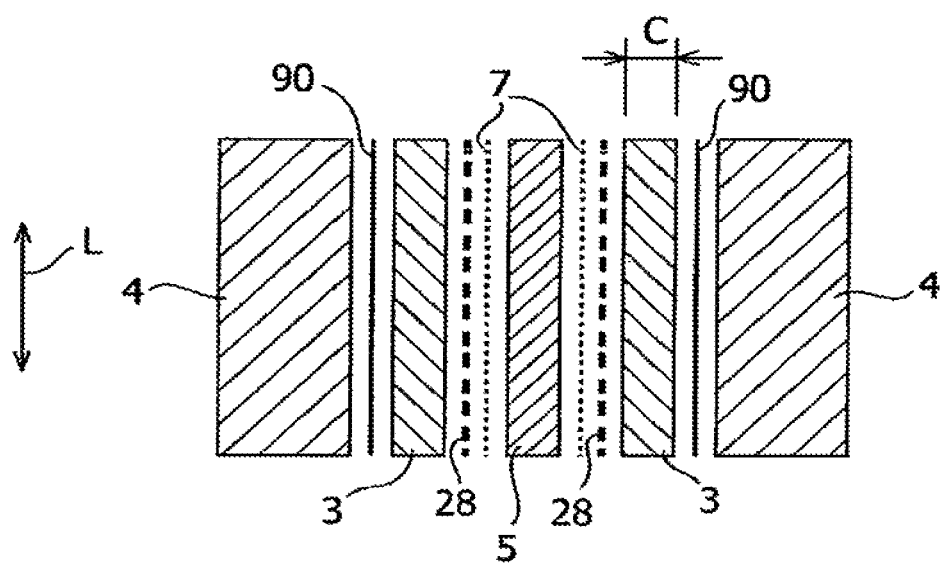
FIG. 2 is a longitudinal cross sectional view taken along the line A-A in FIG. 1.

FIG. 1 is an overall schematic diagram including a cross sectional view taken along the width direction of a molded body in a RTM molding device according to one embodiment of the present invention. That is, the molded body is configured to extend in a direction perpendicular to the plane of the paper containing FIG. 1. FIG. 2 is a cross sectional view taken along the line A-A in FIG. 1. FIG. 2 is a partial cross sectional view of a molded body. The body is divided in a direction perpendicular to the longitudinal direction of the body. The upper part and the lower part of the body are removed. Thus, in FIG. 2, the vertical direction (denoted by an arrow L in the figure) is the longitudinal direction of the molded body.

In FIGS. 1 and 2, a mold to be used as a base is composed of an upper mold half 1a and a lower mold half 1b. The upper mold half 1a and the lower mold half 1b have a mold layer body 30 clamped therebetween. The body 30 will be described in detail later. Reference numeral 6 denotes a sealing material. Reference numeral 6 is indicated at two locations. The sealing material 6 seals a mating surface between the upper mold half 1a and the lower mold half 1b. The longitudinal direction of the molded body corresponds to the vertical direction denoted by an arrow L in FIG. 2. Actually, the upper mold half 1a should have been referred to as a right mold half. Likewise, the lower mold half 1b should have been referred to as a left mold half. However, such terms are not usual in the field of molds. Therefore, the terms "upper mold half" and "lower mold half" are used herein throughout.

A resin reservoir 14 (not shown) is provided in the upper part of the mold 1 (that is, the upper part as seen in the longitudinal direction of the molded body). In addition, this reservoir 14 is located in the upper end of the mold layer body 30. In addition, this reservoir is located toward the suction line 9. The resin reservoir doubles as a suction space.

A resin inlet 14a is provided at the lower end of the mold. The inlet 14a is connected with the resin inlet line 8. The line 8 is formed from a tube made of copper (however, another appropriate material may also be used). Another resin reservoir (not shown) is provided in the lower end of the body 30. In addition, this resin reservoir is located toward the resin inlet line 8. The resin reservoir serves to enable resin to be injected into the lower end of the body 30. That is, the resin reservoir serves to prevent the upper mold half 1a and the lower mold half 1b from preventing resin from being injected into the lower end of the body 30.

The resin inlet line 8 is connected to a resin tank 16. The tank 16 is disposed in a pressure container 15. The line 8 is provided with an on-off valve 8a. The valve 8a serves to open and close the line 8.

This embodiment is configured to pressurize the interior of the container 15 when injecting resin. However, this embodiment may be modified so as to inject resin from the resin tank via a resin injection pump.

Reference numeral 9 denotes a suction line, as noted above. The line 9 is made of copper (however, another appropriate material may also be used). The line 9 is connected to a vacuum pump (not shown). The line 9 communicates via the suction opening 15a to the resin reservoir (suction space) noted above. Reference numeral 11 denotes an on-off valve. The valve 11 serves to open and close the line 9.

The line 9 is provided with an aluminum block 13. The block 13 has a window 12 defined therein. The window 12 transmits radiation therethrough. The block 13 is formed to be generally cubic. The window 12 has a glass fitted therein. The block 13 has still another resin reservoir defined therein.

The block 13 may be made of a material other than aluminum. However, the material must be such that the resin reservoir can be formed. In addition, the material must be such that the radiation transmission window 12 can be provided.

The block 13 may be provided in the resin inlet line 8.

The whole structure extending from the pressure container 15 to the on-off valve 11 is sealed.

The mold layer body 30 is composed of a first horizontal portion 30a, a second horizontal portion 30c, and a vertical portion 30b. This is shown in FIG. 1. The body 30 is generally Z-shaped as seen in the width direction.

FIG. 2 is a longitudinal cross sectional view of the body 30. Reference numeral 5 denotes a molded body. The body 5 is tabular. The body 5 is made of, for example, a reinforcement fiber material. Such material is formed by placing woven fabrics each made of a reinforcement fiber one on another. Such reinforcement fiber is, for example, glass fiber, carbon fiber, aramid fiber, etc.

Reference numeral 3, indicated at two locations, each denotes a chain curing polymer (CCP) jacket. One of the jackets 3 is located adjacent to one outer side of the body 5. The other of the jackets 3 is located adjacent to the other outer side of the body 5. The jacket 3 is filled with a CCP. This is a resin composition of chain curing type. The composition is injected from the resin inlet line 8.

The CCP jacket 3 may be configured in various ways with various members. However, any configuration must be able to contain a large amount of resin, as noted above.

FIGS. 3(a) and 3(b) show one such configuration. FIG. 3(a) is a plan view of such a jacket 3. FIG. 3(a) is a conceptual diagram. FIG. 3(b) is a cross sectional view of the jacket 3 taken along the line B-B in FIG. 3(a).

The jacket 3 is composed of a longitudinal wall 301, an upper surface film 302, and a lower surface film 303. The wall 301 extends in the direction in which resin, after being injected, flows. The jacket 3 includes a plurality of adjacent grooves.

The CCP jacket 3 may be formed from materials referred to as "corrugated plastic fiberboard" or "hollow sheet" (available, for example, under the trade name "twin panel" (Ube-Nitto Kasei Co., Ltd.). These materials are made of polycarbonate. In addition, these materials are tabular. These materials each have the same cross sectional structure as that of a fiberboard. It is clearly more preferable that the jacket be more preferably made of a material that is heat resistant and stiff to a high degree, such as wood, ceramic, metal, etc. That is, the jacket 3 may be made of any of materials of various types, such as: hollow plate materials having the same cross section as that of a fiberboard; honeycomb-structured materials; mesh materials (for example, the resin meshes, wire meshes, etc.); and various types of corrugated plate materials.

FIGS. 3(a) and (b) are merely conceptual depictions. That is, the CCP jacket 3 may be designed such that the grooves thereof correspond to the molded body in terms of shape. For example, if the body 5 is arcuate in shape, the grooves are adapted to extend along the curve.

The jacket 3 is preferably made of a material having the same cross section as that of any of various types of corrugated plate materials and hollow plate materials. In the case of a hollow plate material, the grooves may be used as a passage to have a measurement instrument, etc, such as a thermocouple, disposed therein.

One of the upper surface film 302 and the lower surface film 303 faces the body 5. This film has fine pores 304 defined therein. The pores 304 are configured to penetrate through the film. The pores 304 each have a diameter of approximately 1 to 2 mm. The pores 304 are disposed along the grooves. Each pair of adjacent pores 304 are spaced apart from each other by a distance of approximately 1 to 2 cm.

The thickness of the CCP jacket is determined from an optimal value of the fiber volume content Vf. The fiber volume content Vf is based on the curing characteristics of the CCP and the characteristics of radiation of heat into the outside. The thickness is mostly approximately 0.5 mm to 20 mm. It is preferably 1 mm to 10 mm. It is more preferably 2 mm to 6 mm. If the thickness is less than 0.5 mm, this makes it difficult to install the jacket. In addition, this increases to a large degree the amount of heat emitted into the environment. If the thickness is greater than 20 mm, this increases to a large degree the amount of unused resin material. This in turn is likely to increase the cost.

As shown in FIG. 2, the body 5 and each of the jackets 3 have a mold releasing sheet 7 interposed therebetween, respectively. Each of the sheets 7 is placed on the body 5. The sheet 7 is made of a 3TLL, a peel ply, etc. The sheet 7 serves to separate the body 5 and the jacket 3 from each other.

The outer side of the sheet 7 has a porous plate 28 disposed thereon. The plate 28 is made of a perforated metal, a wire mesh, etc.

The outer side of one of the jackets 3 faces the upper mold half 1a. The outer side of the other of the jackets 3 faces the lower mold half 1b. Both outer sides and the mold halves 1a and 1b have a heat insulating material 4 interposed therebetween, respectively. The heat insulating material 4 constitutes a heat conduction suppressing means. This means serves to suppress conduction of heat from the jackets 3 to the mold halves 1a and 1b. In addition, both outer sides and the heat insulating materials 4 have a Teflon sheet 90 interposed therebetween, respectively. The term "Teflon" is a registered trademark.

The heat insulating material 4 serves to enhance the chain curing reaction in the resin. Therefore, the material 4 is preferably made of wood. The reason is that wood is low in cost and has high heat insulation characteristics. However, as is described below, the temperature of the molded body 5 is controlled. Therefore, a material having varied heat conductivity may be adopted.

That is, the heat insulating material 4 has a heat conductivity of 0.3 W/(m*K) or less. It is preferably 0.2 W/(m*K) or less. It is more preferably 0.1 W/(m*K) or less. Such heat insulating material is, for example, wood, heat insulating board, etc.

In the present invention, a heat conduction suppressing means using the jacket 3 and the heat insulating material 4 is designed to make it possible to cure a CCP at a fiber volume content Vf no greater than a limit value. The content Vf is a volume content of fibers in a molded body, which is made of fiber reinforced plastics (FRP). The limit value of the content Vf is determined from the curing characteristics (described later) of the CCP and the characteristics of radiation of heat from the jacket 3 into the outside via the heat conduction suppressing means using the heat insulating means. For example, if a CCP is intended to be curable at a content Vf no greater than 43%, the means is designed to make it possible to sufficiently cure the CCP at any content of Vf not less than 43%.

A CCP is a resin composition of the chain curing type, as noted above. A CCP is adopted for the RTM molding device according to the present invention. Such a CCP is a matrix resin to be filled into the CCP jacket 3. The CCP begins to cure upon exposure to radiation, such as UV radiation, etc. During the curing process, the CCP utilizes the heat arising from the curing reaction thereof to induce a chain curing reaction.

That is, in the above CCP, upon exposure to radiation, the location exposed to radiation begins to cure. Subsequently, the heat arising from this curing reaction induces a chain curing reaction at the location. Therefore, the curing process can be completed whether or not radiation penetrates to places other than the surface of the CCP, and whether or not the radiation is blocked by obstacles and is thereby prevented from penetrating to places other than the surface of the CCP. Therefore, the CCP is quickly cured even at deeper levels. For example, a carbon fiber reinforced plastic (CFRP) that is 1 cm thick can be completely cured within three minutes.

Such a CCP may be a resin composition disclosed in JP 11-193322A. This composition comprises, in a specific weight ratio: a component acting as a photo/thermal initiator of cationic polymerization; and a photoinitiator for cationic polymerization. In this resin composition, a CFRP that is 1 cm thick is curable within three minutes.

A superior resin composition disclosed in JP 11-193322A comprises 100 parts by weight of a photopolymerizable resin; and 0.6 to 5 parts by weight of a component acting as a photopolymerization initiator composed of at least two components. The photopolymerizable resin is selected from a group consisting of: a photopolymerizable epoxy polymer, such as an alicyclic epoxy, a glycidyl ether epoxy, an epoxidized polyolefin, etc.; and a vinyl ether compound. A superior resin composition comprises, in a weight ratio of 1 to 4: a component acting as a photo/thermal initiator of cationic polymerization; and a photoinitiator for cationic polymerization.

A photo/thermal initiator of polymerization may initiate polymerization by one or both of light and heat (see JP 7-300504A, section [0002]).

Alternatively, a resin composition of the chain curing type disclosed in JP 2001-89639A may also be adopted. This resin composition of the chain curing type uses an iron-allene compound as a specific photopolymerization initiator. In addition, this resin composition comprises, in a ratio: 1 mole of a photo-polymerizable resin able to react with a component acting as a curing agent; and 0.1 to 1.4 moles of the component acting as a curing agent. All this together is able to induce a chain curing reaction in the resin composition. Alternatively, a specific sulfonium salt is used. In addition, this resin composition comprises: 1 mole of a photopolymerizable resin able to react with a component acting as a curing agent; and 0.1 to 1.4 moles of the component acting as a curing agent. In addition, this resin composition comprises: 100 parts by weight of all components except the component acting as a photopolymerization initiator; and 0.1 to 6.0 parts by weight of the component acting as a photopolymerization initiator. All this together induces a chain curing reaction in the resin composition upon exposure to UV light (ultraviolet light).

Alternatively, a resin compound from Elementis Co., Ltd., disclosed in U.S. Pat. No. 6,245,827 B1 may be adopted. This resin composition comprises, as a photopolymerizable resin, an alicyclic epoxy, a vinyl ether or a mixture of one of these and an epoxidized polyolefin. In addition, this resin composition comprises at least one thermal polymerization initiator made of organic peroxide and one photo/thermal initiator of cationic polymerization added thereto. In addition, this resin composition comprises an α-hydroxyketone as a sensitizing agent. All this together is able to induce likewise a chain curing reaction in this resin composition.

Another matrix resin is, for example, another resin composition made by Elementis Co. Ltd. This resin composition induces the same mechanism of chain curing as described above. This resin composition is, for example: a vinyl ether resin composition; a glycidol containing resin composition; an oxetane resin composition, or a radical composition.

In FIG. 1, reference numeral 17 indicated at plural locations denotes a temperature sensor composed of a thermocouple, etc. The sensors 17 are spaced apart from each other by a predetermined distance (for example, approximately 4 cm). The sensors 17 are disposed on the molded body 5. Alternatively, the sensors 17 are disposed on the jackets 3 and are proximal to the body 5. The sensors 17 are arranged sequentially from the inlet side connected to the resin inlet line 8 to the side opposed to the inlet side and connected to the suction line 9. Thus, the sensors 17 serve to measure the temperature of the body 5.

Reference numeral 21 denotes a resin flow meter. The meter 21 is disposed in the line 8. The meter serves to measure the flow of a CCP injected into the jackets 3.

Reference numeral 20 denotes a control means. The means 20 receives a signal representing the temperature of the body 5 measured by each of the sensors 17. The means 20 also receives a signal representing the flow of the injected CCP measured by the meter 21. This is performed for each product to be molded. This makes it possible to maintain consistent quality. The means 20 performs a control operation based on the measured flow of the injected CCP in order to ensure that an appropriate flow of a CCP is injected into the jackets 3.

In the RTM molding device configured as described above, the mold layer body 30 accommodating the molded body 5 is between the upper mold half 1a and the lower mold half 1b. Then, the sealing material 6 seals fluid-tightly a mating surface between the upper mold half 1a and the lower mold half 1b.

Subsequently, the CCP, after being degassed, is placed in the resin tank in the pressure container. Subsequently, the on-off valve 8a in the resin inlet line 8 is closed. Subsequently, the line section running from the pressure container 15 to the valve 8a is gradually evacuated (that is, the inner pressure thereof is decreased to a sufficiently low pressure). Subsequently, the on-off valve 11 is opened. Subsequently, the vacuum pump (not shown) is caused to evacuate the suction line 9. This causes the mold 1 to be evacuated (that is, the inner pressure thereof is decreased to a sufficiently low pressure). Subsequently, the interior of the pressure container is pressurized to a normal pressure or several atmospheres. Subsequently, the valve 8a in the line 8 and the valve 11 in the line 9 are opened. This causes the CCP (resin composition of chain curing type) stored in the resin tank 16 in the container 15 to be discharged to enter into the CCP jackets 3 via the line 8. This results in the jackets 3 being filled with the CCP.

The CCP after being filled in the CCP jackets 3 flows through the grooves described above. Subsequently, the CCP exits the pores 304 defined in the film designed to cover the grooves. Subsequently, the CCP passes through the mold releasing sheets 7 (and through the perforated plates 28). Subsequently, the CCP permeates the molded body 5. This results in the body 5 being impregnated with the CCP.

This also results in the resin reservoir in the upper end of the mold layer body 30 having resin stored therein. This also results in the aluminum block 12 having resin stored therein.

When the jackets 3 are completely filled with the CCP, this is confirmed by the measurements of the resin flow, etc. Upon confirming this, the on-off valve 11 is closed. Subsequently, the interior of the pressure container is pressurized to, for example, six atmospheres. Subsequently, resin is injected under pressure. The jackets 3 are thereby better impregnated with resin, thereby resulting in voidless impregnation. Then, the vacuum pump (not shown) is stopped. This ends the operation of impregnating the CCP into the body 5.

Subsequently, the CCP is cured by being irradiated with radiation entering through the radiation transmission window 12 provided in the aluminum block 13. A UV-curable resin composition is irradiated with ultraviolet light. This initiates chain curing of the CCP. Chain curing may be initiated by various types of radiation. However, it is certainly also possible to heat part of the block 13 or part of the copper tube, that is, the line 9.

The block 13 has a resin reservoir formed therein, as noted above. When curing is initiated by UV, etc., this will then result in chain curing. This causes resin in the suction line 9 to be sequentially chain-cured. The chain curing reaction proceeds to the resin reservoir 14. The reservoir 14 accommodates solely CCP. Therefore, the chain curing reaction proceeds quickly through the reservoir 14 and through the Z-shape passage in the Z-shaped mold layer body 30 to the lower end of the body 30. That is, the chain reaction proceeds through the whole length of the Z shape in the direction from the suction line 9 toward the inlet line 8.

As noted above, there is another resin reservoir provided in the lower end of the body 30. This reservoir is located toward the inlet line 8. This reservoir may be provided with a thermocouple. It may be thereby designed such that that when the thermocouple detects the heat generated by the chain curing reaction, this causes the valve 8a located toward the inlet line 8 to be closed. This prevents the remaining resin in the pressure container 15 from being chain-cured. The interior of the pressure container may be pressurized at a pressure of approximately 6 atmospheres until the end of the chain curing reaction. In this embodiment, the process of resin impregnation can be performed throughout in an excellent manner by the thermocouple monitoring the resin reservoir located toward the inlet line 8 and by pressurizing the interior of the mold layer body 30 until immediately before the end of the chain curing reaction.

After the onset of the curing reaction in the CCP, the maximum temperature at the front end portion of the chain-cured area within the CCP within 10 seconds, preferably 5 seconds, most preferably 3 seconds, from the onset of the curing reaction is increased by 50 degrees Celsius or more from the temperature of the resin composition after the completion of the impregnation process and before the onset of the curing reaction. The inventors confirmed that the temperature difference of 50 degrees Celsius or more causes the chain curing reaction to proceed. The temperature difference is preferably 70 degrees Celsius or more, more preferably 100 degrees Celsius or more. When such a temperature difference is maintained, this makes it possible to maintain the resin characteristics (for example, the resin viscosity) that are preferable for the molding operations, such as resin injection, that are to be performed before the onset of the curing reaction, over the entire time necessary for executing such operations.

The positive temperature gradient at the front end portion of the cured area within the CCP during the chain curing process is 300 degrees Celsius per minute or more, more preferably 600 degrees per minute or more, most preferably 1000 degrees Celsius per minute or more.

The above advantageous effect can be obtained by the following alternative procedure. After the onset of the curing reaction in the CCP, the maximum temperature at the front end portion of the chain-cured area within the CCP within 10 seconds from the onset, preferably 5 seconds, most preferably 3 seconds, from the onset of the curing reaction is increased so as to reach a temperature no less than the temperature at the onset of the heat curing reaction in the resin composition. In addition to the temperature at the onset of the heat curing reaction, it is preferable to reach a temperature of no less than 20 degrees Celsius. Furthermore, in addition to the temperature at the onset of the heat curing reaction, it is more preferable to reach a temperature of no less than 50 degrees Celsius. The temperature at the onset of the heat curing reaction is defined by the temperature at the onset of the heat curing reaction (onset value) and the temperature at the end of the heat curing reaction (end value), both measured by the differential scanning calorimeter (DSC) (the rate of temperature increase is 10 degrees Celsius per minute).

If carbon fiber is adopted as a reinforcement fiber material for the CCP, and if the fiber volume content Vf reaches a value not less than 41%, even a resin composition of the chain curing type is difficult to sufficiently cure. In this embodiment, the resin reservoir 14 and the resin jacket 3 together make it possible to maintain the conditions that allow the chain curing reaction to proceed uninterrupted.

In the molding device according to the present invention, a fiber volume content Vf of 41 to 70% is sufficient to enable the chain curing reaction to proceed uninterrupted.

The RTM molding device according to this embodiment of the present invention is configured as described above. This embodiment includes the following configuration. The upper mold half 1a and the lower mold half 1b have a molded body 5 disposed therein. The body 5 is made of a reinforcement fiber material. The CCP jackets 3 are disposed along the longitudinal direction of the body 5. The jackets 3 are disposed adjacent to both outer sides of the body 5, respectively. The jacket 3 is filled with a CCP (resin composition of the chain curing type). The outer side of one of the jackets 3 faces the upper mold half 1a. The outer side of the other of the jackets 3 faces the lower mold half 1b. Both outer sides and the mold halves 1a and 1b have a heat insulating material 4 interposed therebetween, respectively. The heat insulating material 4 constitutes a heat conduction suppressing means. This means serves to suppress conduction of heat from the jackets 3 to the mold halves 1a and 1b. In addition, the outer jackets 3 and the body 4 have a porous plate 28 disposed therebetween, respectively. The plate 28 is made of a perforated metal, a wire mesh, etc.

The above configuration makes it possible to inject a CCP in a desired supply pattern from the resin injection line 8 into the jackets 3. The jackets 3 are disposed along the longitudinal direction of the body 5 on both outer sides of the body 5, respectively. The above configuration also makes it possible to impregnate the CCP into the body 5 via the porous plates 28 while the suction line 9 is sucking the CCP from inside the jackets 3.

The above configuration also makes it possible to appropriately chain-cure the molded body 5 without occurrence of the following two events. The first event involves generating decrease in temperature over the whole length of the body 5. The second event involves generating excessive increase in temperature. The first event is prevented by suppressing dissipation of heat from the jackets 3 into the mold halves 1a and 1b by use of the heat conduction suppressing means. This means is, as noted above, for example, the heat insulating materials 4 disposed on both outer sides of the jackets 3, respectively. The second event is prevented by appropriately adjusting the heat conduction capacity of the heat conduction suppressing means.

INDUSTRIAL APPLICABILITY

The present invention relates to a resin transfer molding (RTM) method and to a resin transfer molding device to be used when molding fiber reinforced plastics (FRPs). In particular, the present invention involves using a chain curing polymer (CCP). This is a resin composition of the chain curing type. The present invention enhances thereby the fiber volume content of the FRP body to be molded. In addition, the present invention thereby makes it possible to obtain a molded body having superior lightweight properties.

The invention claimed is:

1. A method of creating a fiber-reinforced plastic (FRP) molded body, the method comprising:
    positioning a molded body made of a reinforced fiber material into an interior of a mold, the mold interior comprising a resin reservoir, whereby the mold holds within said interior at each of opposite surfaces of the molded body a hollow chain curing polymer (CCP) accommodating layer having a thickness of approximately 0.5 mm to 20 mm, a separating element positioned between each CCP accommodating layer and the molded body, and a heat insulating member positioned between each CCP accommodating layer and the mold;
    injecting a CCP resin into the resin reservoir and into the remaining interior of the mold to impregnate the positioned molded body and to fill each CCP accommodating layer;
    curing the injected CCP resin, whereby CCP resin curing in the resin reservoir and in each CCP accommodating layer generates heat maintaining conditions allowing for a chain curing reaction to proceed uninterrupted so as to form the FRP molded body; and
    separating the FRP molded body from each separating element,
    wherein the FRP molded body has a fiber volume content (Vf) limit value depending on curing characteristics of the CCP resin and on heat dissipation characteristics of the CCP resin to outside of the mold, and
    wherein said curing is initiated by a radiation source.

2. The method according to claim 1, further comprising:
    decreasing a pressure of the interior of the mold via a suction line before said injecting; and
    injecting by supplying the CCP resin into the interior of the mold via a resin injection line under said decreased pressure.

3. The method according to claim 1, wherein each CCP accommodating layer comprises a CCP jacket.

4. The method according to claim 3, wherein a surface of each CCP jacket located on a side adjacent to the molded body is porous.

5. The method according to claim 3, further comprising positioning a porous wire mesh plate between each separating element and CCP jacket.

6. The method according to claim 1, wherein each separating element is a releasing sheet.

7. The method according to claim 1, wherein each separating element and adjacent CCP accommodating layer are layered on each other to form a mold layer body.

8. The method according to claim 1, wherein each CCP accommodating layer has a thickness of 1 mm to 10 mm.

9. The method according to claim 1, wherein each CCP accommodating layer has a thickness of 2 mm to 6 mm.

10. The method according to claim 1, wherein the FRP molded body has a fiber volume content (Vf) of 41% to 70%.

11. The method according to claim 1, wherein the insulating member comprises a heat insulating material having a heat conductivity of 0.3 W/m*K or less.

12. A method of creating a fiber-reinforced plastic (FRP) molded body, the method comprising:
    positioning a molded body made of a reinforced fiber material into an interior of a mold, the mold interior comprising a resin reservoir, whereby the mold holds within said interior at each of opposite surfaces of the molded body a porous and hollow chain curing polymer (CCP) jacket having a thickness of approximately 0.5 mm to 20 mm, a separating element positioned between each CCP jacket and the molded body, and a heat insulating member positioned between each CCP jacket and the mold;

injecting a CCP resin into the resin reservoir and into the remaining interior of the mold to impregnate the molded body and to fill each CCP jacket;

curing the injected CCP resin, whereby CCP resin curing in the resin reservoir and in each CCP jacket generates heat maintaining conditions allowing for a chain curing reaction to proceed uninterrupted so as to form the FRP molded body; and separating the FRP molded body from each separating element, wherein the FRP molded body has a fiber volume content (Vf) limit value depending on curing characteristics of the CCP resin and on heat dissipation characteristics from the CCP resin to outside of the mold, wherein said curing is initiated by a radiation source, and wherein said injection comprises:

decreasing a pressure of the interior of the mold via a suction line at a first side of the molded body; and supplying the CCP resin into the interior of the mold via a resin injection line at a second side of the molded body under said decreased pressure.

13. The method according to claim 12, wherein each separating element is a releasing sheet.

14. The method according to claim 12, wherein each separating element and adjacent CCP jacket are layered on each other to form a mold layer body.

15. The method according to claim 12, wherein each CCP jacket has a thickness of 1 mm to 10 mm.

16. The method according to claim 12, wherein each CCP jacket has a thickness of 2 mm to 6 mm.

17. The method according to claim 12, wherein the FRP molded body has a fiber volume content (Vf) of 41% to 70%.

18. The method according to claim 12, wherein the insulating member comprises a heat insulating material having a heat conductivity of 0.3 W/m*K or less.

* * * * *